(No Model.)

J. W. ZINN.
HEATING ATTACHMENT FOR LAMPS.

No. 401,475. Patented Apr. 16, 1889.

WITNESSES:
INVENTOR:
J. W. Zinn
BY Munn & Co.
ATTORNEYS.

UNITED STATES PATENT OFFICE.

JOHN W. ZINN, OF HAWTHORNE, FLORIDA.

HEATING ATTACHMENT FOR LAMPS.

SPECIFICATION forming part of Letters Patent No. 401,475, dated April 16, 1889.

Application filed July 12, 1888. Serial No. 279,776. (No model.)

*To all whom it may concern:*

Be it known that I, JOHN W. ZINN, of Hawthorne, in the county of Alachua and State of Florida, have invented a new and Improved Heating Attachment for Lamps, of which the following is a full, clear, and exact description.

The invention relates to devices for use in connection with lamps to utilize the heat thereof for heating a vessel placed above the flame.

The invention consists in a novel construction of the said vessel-supporting device, as hereinafter described, and pointed out in the claims.

Reference is to be had to the accompanying drawings, forming a part of this specification, in which similar letters of reference indicate corresponding parts in both the figures.

Figure 1:
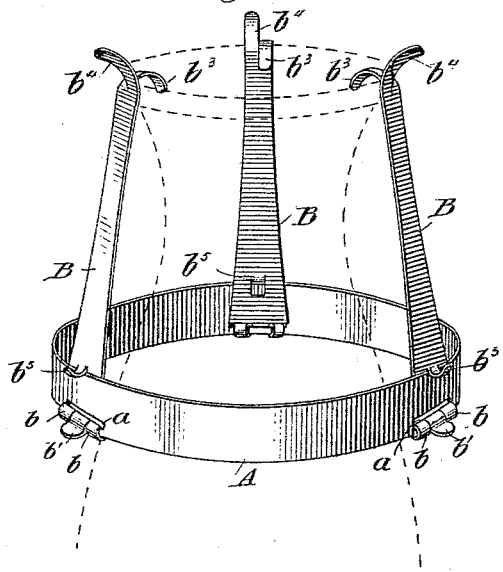
Figure 2:
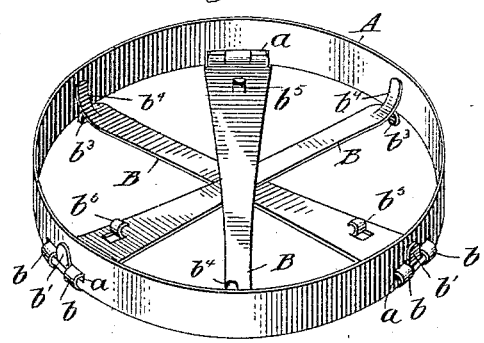

Figure 1 is a perspective view of the device, the hinged arms being in the raised position; and Fig. 2 is a like view showing the arms folded within the base.

The invention includes, primarily, a suitable base and a series of arms or uprights hinged to the said base, adapted when raised to support a suitable vessel above the flame of the lamp for heating the contents of the vessel.

The particular form of the base and arms and the particular manner of hinging the arms to the base may be varied in practice; but the preferred form of the invention illustrated will be found practical and durable.

In the construction shown the base A is of flat or band metal in the form of a ring, and is formed with slots $a$ at intervals around the same, and to the said base at said slots $a$ are hinged the arms or uprights B, the hinge-connection of the arms to the base being effected by dividing the bottom edge of the arms into triplicate ends $b\ b\ b'$, the side members, $b\ b$, being bent around the lower edge of the base, at the slots $a$ thereof, and the middle or inner members, $b'$, being bent outward at about a right angle, forming a stop for limiting the downward movement of the arms.

The upper end of each arm B is slitted vertically, and the divided ends thus formed are bent in opposite directions, the ones $b^3$ forming hooks for suspending the device from the upper edge of the chimney of a lamp, while the ones $b^4$ are slightly higher than the hooks $b^3$, and serve to support a suitable vessel above the chimney.

On the arms B, at a distance from the bottom edge about equal to the height of the base A, there are struck up from the said arms outwardly-projecting and slightly upwardly-curving projections $b^5$, which form spring-catches that are sprung over the upper edge of the base when the arms are raised to the vertical position, whereby the said arms are positively maintained in the raised position.

In the folded position the arms or uprights B are received within the circular base A, and are thus protected from injury; also, the feature of the folding arms gives the device a more convenient form than if the said arms were permanently fixed in the raised position.

Having thus described my invention, what I claim as new, and desire to secure by Letters Patent, is—

1. A heating attachment for lamps, consisting, essentially, of a base adapted to encircle the lamp-chimney and be supported thereon, and a series of arms or uprights hinged to the base and extending above the chimney-top, substantially as shown and described.

2. The combination, with the base adapted to encircle the lamp-chimney and be supported thereon, of a series of arms hinged to the base and extended above the lamp-chimney, each provided with a stop projection at the lower end for limiting the downward movement of the said arms, substantially as described.

3. The combination, with the base adapted to encircle the lamp and be supported thereon, of a series of arms hinged to the lower edge of the base and extended above the lamp-chimney, said arms provided with catches adapted to engage the upper edges of the base, whereby said arms are held in a raised position, substantially as shown and described.

4. The combination, with the base adapted to encircle a lamp-chimney, of arms hinged to said base and divided at their upper ends, the said divided portions being bent in opposite directions, forming hooks for suspending the device from the top of the chimney, and supports for a vessel, substantially as described.

JOHN W. ZINN.

Witnesses:
 CALVIN WAITS,
 P. F. STOCK.